United States Patent Office 2,764,507
Patented Sept. 25, 1956

2,764,507

TREATMENT OF FILMS WITH METHYLOLCAR-
BAMYL POLYAZAALKANE RESINS

Yun Jen, Stamford, and William M. Wooding, Springdale,
Conn., assignors to American Cyanamid Company,
New York, N. Y., a corporation of Maine No Drawing. Application September 17, 1954,
Serial No. 456,868

15 Claims. (Cl. 117—76)

The present invention relates to non-fibrous regenerated cellulose film uniformly impregnated with a minor but effective amount of a methylolcarbamyl polyazaalkane resin as anchoring agent and to such impregnated film carrying a subsequently applied water-resistant topcoat. The invention includes methods for applying both the anchoring resin and the topcoat to the film.

Non-fibrous regenerated cellulose film is commercially manufactured by extrusion of viscose solution into an aqueous coagulating bath to form a film, clearing and washing the film, passing the film into a plasticizing bath, and drying the plasticized film. Such film is both water-permeable and water-sensitive and cannot be used as wrapping material where moisture resistance is required. Such film is therefore usually provided with an organic moisture-proofing topcoat permitting the product to be used for the packaging of moist substances including foods.

It is known that organic water-proofing topcoats, when applied directly to untreated regenerated cellulose film, rapidly blister and slough off when in contact with moisture. It is further known that this sloughing off can be retarded by first applying a suitable anchoring resin to the regenerated cellulose film, and then applying the topcoat.

Such anchoring resin, in the form supplied, should be freely dispersible in water and have an affinity for cellulose, so as to avoid the cost and hazard presented by organic solvents. Then, it should form a highly moisture-resistant, odorless, and water-clear bond between the cellulose film and the subsequently applied topcoat. Moreover, the resin after application to the film should convert or "cure" to an insoluble, hydrophobic condition sufficiently rapid to minimize delay in the manufacturing process.

The present invention principally rests upon the discovery that the thermosetting cationic methylolcarbamyl polyazaalkane resins in at least partially cured form act as excellent anchoring agents in non-fibrous regenerated film for subsequently applied topcoat material. The invention further rests upon the discovery that such film can be prepared by impregnating at least one surface of the film with an aqueous solution of the resin and drying the film, the step of drying being sufficient to convert the resin into at least partially cured form. The topcoat material is then applied in normal manner.

The methylolcarbamyl polyazaalkane resins referred to correspond to those prepared by reacting a water-soluble but high molecular weight polyalkylenepolyamine first with urea or a metal cyanate and then with formaldehyde. From the theoretical equations involved it is believed that the resins are characterized by recurring methylolcarbamyl (—CO—NHCH$_2$OH) groups attached to the long chain high molecular weight polyalkylenepolyamine.

To avoid confusion with the low molecular weight polyalkylenepolyamines commonly used in resin manufacture, the high molecular weight polyalkylenepolyamines employed in the present invention are hereinafter termed polyazaalkanes. The actual structure of the resins has not been definitely ascertained, and the evidence is that they are complex mixtures resulting in part from the fact that the raw materials themselves are normally mixtures and in part from side reactions which take place during the normally water-dispersible resin synthesis. The resins are therefore most conveniently defined in terms of processes for their preparation.

Preferred resins of the type described possess the following particularly beneficial properties:

1. They are very effective when present in practically trace amounts, thus minimizing the amount needed to effect satisfactory anchoring. Being cationic, the resins have a strong affinity for cellulose.

2. The resins rapidly cure to hydrophobic form even when they are applied to the film at an alkaline pH and even when the film is dried at room temperature. Excellent results are obtained when the film is dried by heating for minimum times and at minimum temperatures permitted by present day industrial practice. As a result the presence of an acid catalyst is not required, so that the film is stronger and more durable. Also, no prolonged high temperature cure is necessary, permitting greater machine output. Moreover, the resins cure well on the acid side. Hence pH control is not critical.

3. The resins cure satisfactorily in the presence of polyvalent anions such as the anions normally present in water as well as those delivered to the impregnating bath by freshly formed regenerated cellulose film. As a result the resins of the present invention are particularly useful in continuous commercial processes for the manufacture of cellulosic film, and the manufacturer is not required to vary established procedures.

4. The resins are water-white to light straw in color when viewed in bulk. Because of this and the very small amount which need be present, the resins cause no perceptible alteration in color even to untinted regenerated cellulose film.

5. The resins are compatible with the non-ionic water-soluble polyhydric alcohols commonly used for the plasticization of regenerated cellulose such as glycerol, and may be mixed therewith especially when the solution is predominantly aqueous, that is, when it contains more than 50% of water. Hence the steps of plasticizing the film and impregnating the film with the anchoring resin may be combined, thus eliminating a step which would otherwise be necessary.

6. The impregnated film, after drying and cure of the resin, can be formed into rolls and stored for an extended period of time, the anchor resin showing no tendency to cause the sheets of film in the roll to adhere or "block" together. On the contrary, the resins impart good "slip" to the film. The present invention thus permits the film to be anchor-coated by the film manufacturer and to be top-coated by the consumer. The invention further permits printed matter and ornamental design work to be imprinted on the film at the time the film is fed to automatic wrapping and packaging machines, the resin acting as an anchoring agent for such imprinted matter as well.

According to a preferred embodiment suitable for commercial practice, the anchoring resins are applied as follows.

A plasticizing bath is formed by dissolving a suitable polyhydric alcohol plasticizer such as glycerol in water. Ordinarily such a solution contains about 5% to 20% by weight of the plasticizer. There is then added sufficient of an aqueous solution of an anchoring resin of the present invention to provide between about 0.005% and 2.5% of the resin on the weight of the solution. The pH of such baths generally falls within the range of 4.0 to 9.0 and such baths may be used without pH adjustment.

More advantageously, however, the pH of the bath is adjusted to fall within the range of about 7.0–8.0, the strength and durability of the film thereby being improved. Moreover, it is common practice to employ the subsequently applied top coat as a heat sealing adhesive, a thermoplastic top coat being used for this purpose. We have found that the bond strength of the thermoplastic top coat to the regenerated film usually is best when the anchoring resin bath has a pH between 7.0 and 8.0. Cure of the anchoring resin, however, is accelerated by acid, and if desired the pH of the bath may be decreased to the point at which the film becomes seriously damaged. This usually occurs at about pH 3.5.

Regenerated cellulosic film (preferably but not necessarily in wet swollen condition) is then passed through the bath and dried, thereby at least partially curing the resin to a hydrophobic, i. e., water-insoluble form. Steam-heated rolls such as are customarily used in the manufacture of regenerated cellulosic film may be employed, and the temperature of the film during drying may be carried as high as 250° F. so as to cure the resin substantially completely. Within the normal range of 170° to 230° F. drying is complete in about ½ to 3 minutes and the resin has become sufficiently cured or hydrophobic that the resulting film can safely be wound and stored in the form of large rolls without tendency to "block." Since regenerated cellulosic film impregnated in the manner described normally picks up about twice its weight of liquid, the finished film consists essentially of plasticized non-fibrous regenerated cellulose film impregnated with between about 0.01% to 2.5% of its weight of a thermosetting methylolcarbamyl polyazaalkane resin in thermocured, hydrophobic form. The particular plasticizer employed and the amount thereof are not features of the present invention.

An organic moisture proofing top coat is then applied, and the film heated to dry the top coat. The final film thus consists of the foregoing resin-impregnated film bearing top coat material on either or both sides.

Modifications of the foregoing procedure are possible. For example, the anchoring resin need not be applied by passing the film into a bath containing the resin. A spray application is substantially as effective, the excess liquid being removed by draining and squeezing. The resulting film has one surface impregnated with the resin.

The effect of the resin as an anchoring medium is noted when the dry film contains as little as 0.01% by weight of the anchoring resin, so that there appears to be no minimum amount of anchoring resin which will not produce some beneficial result. Commercially acceptable anchoring generally follows when the film contains about 0.05% of the resin. Larger amounts usually effect somewhat better anchoring, and improvements have been noted up to 5%, but it is a surprising feature that the preferred resins are effective in practically trace amounts, that is, in the range of about 0.05%–0.5%. In practice we therefore prefer to use these very minor amounts.

The anchoring resins of the present invention may be prepared by a variety of procedures, all of which however result in cationic thermosetting methylolcarbamyl polyazaalkane resin. Broadly, the process comprises introducing methylolcarbamyl groups into a water-soluble polyazaalkane having a molecular weight such that the Gardner-Holdt viscosity of an aqueous solution thereof at 33% calculated resin solids content and 25° C. is at least A3.

The high molecular weight polyazaalkanes may be prepared by several known methods. One suitable method is to homopolymerize an alkylenimine such as ethylenimine. A suitable high molecular weight polyazaalkane essentially linear in structure results.

Alternatively, a low molecular weight alkylenepolyamine (for example, a polyalkylenepolyamine) may be reacted with about 0.6–1.2 mols of a dichloroalkane containing a total of from 2 to 6 carbon atoms and containing from 2 to 5 carbon atoms between the chlorine atoms thereof. Representative compounds are 1,2-dichloroethane, 1,2-dichloropropane, 1,3-dichloropropane, and 2,4-dichloropentane. The bromo- and iodo-analogues of these compounds are equivalents therefor. Best results are obtained when the dihaloalkane contains a total of not more than 4 carbon atoms. If desired, the reaction may be performed in stages, a small amount of the dichloroalkane being reacted first and the resulting intermediate-sized polyalkylenepolyamine being further reacted with the remainder of the dichloroalkane preferably in the presence of an acid acceptor. As alkylenepolyamines there may be employed ethylenediamine, trimethylenediamine, diethylenetriamine, triethylenetetramine, tetraethylenepentamine and the corresponding polypropylenepolyamines, as well as mixtures thereof. In addition there may be used other lower water-soluble polyalkylene-polyamines including 3,3′-iminobispropylamine, and 3,3′3″-nitrilotrispropylamine, as well as amines containing a tertiary nitrogen atom represented by N-methyl-3,3′-iminobispropylamine. Such lower alkylenepolyamines, including the polyalkylenepolyamines, have molecular weights below about 250.

Resins of superior anchoring effectiveness are obtained, we have found, when proceeding in the manner just described, when the polyalkylenepolyamine and the dichloroalkane are selected so that the polyalkylenepolyamine or alkylenepolyamine each has at least two and not more than four linear alkylene carbon atoms and so that the number of carbon atoms between the chlorine atoms of the dichloroalkane plus the number of linear alkylenecarbon atoms of the alkylenediamine is at least five. Thus we have found that superior results are obtained when amines such as diethylenetriamine, tetraethylenepentamine etc. (the alkylene groups of which contain two linear carbon atoms) are reacted with 1,3-dichloropropane (which contains three linear carbon atoms) and when amines such as 3,3′-iminobispropylamine (the alkylene groups of which contain three linear carbon atoms) are reacted with 1,2-dichloroethane or 1,3-dichloropropane, which contain respectively two and three linear carbon atoms. It will be observed that in each of these examples the number of carbon atoms between the chlorine atoms of the dichloroalkane plus the number of linear alkylene carbon atoms of the alkylenediamine is at least five. It is believed that the effect of this selection of raw material is to minimize formation of six-membered alicyclic rings in the polyazaalkane formed, with development of a polyazaalkane of larger molecular size and consequently greater viscosity than would otherwise be the case.

We have found that the effectiveness of the resulting polyazaalkanes as intermediates for the synthesis of the anchoring resins of the present invention increases as their chain length or molecular weight increases. As a result we prefer the last-mentioned method of synthesis. The molecular weight is a function of the amount of dihaloalkane employed. We further prefer to employ sufficient of the dichloroethane so as to obtain polyazaalkanes which have a Gardner-Holdt viscosity of at least A3 as 33% aqueous solution at 25° C. Considerably better results are obtained when the resin has a viscosity of A on the same scale. At the other extreme when the polyazaalkane has a viscosity of greater than about T, the final methylolcarbamyl polyazaalkane resin tends to gel at concentrations higher than about 15% resin solids, and to avoid this danger we prefer to use only sufficient of the dichloroalkane to form a polyazaalkane having a viscosity of not more than T. The molecular size of the polyazaalkane is in addition dependent upon the nature as well as the amount of the reagents. The correct ratio of the two to form a polyazaalkane of optimum viscosity will thus vary in each instance. These amounts, however, may be readily determined in each instance by routine laboratory trial, and are, therefore, not a particular feature of the invention.

The second principal step in the synthesis of the anchoring resins of the present invention is to introduce methylolcarbamyl groups into the high molecular weight polyazaalkanes just described. There are two convenient methods for so doing, each involving first the introduction of carbamyl groups followed by the introduction of methylol groups.

The first method is based upon the reaction of the polyalkylenepolyamine with urea at above 100° C., from about 0.7 to about 1.3 mols of urea being employed per nitrogen atom in the polyalkylenepolyamine. The temperature may be carried to about 200° C. Ammonia evolves and the reaction is terminated when the rate of evolution of ammonia substantially ceases. Any excess urea employed is not wasted as it reacts with formaldehyde in the steps which follow, forming a resin of appreciable anchoring effectiveness.

According to a second and preferred method, the carbamyl groups are introduced by reacting the polyazaalkane with a water-soluble metal cyanate. When proceeding in this manner, the polyazaalkane is preferably first converted to the form of its full salt by addition of an acid such as sulfuric acid, acetic acid, formic acid, or hydrochloric acid. About 1 mol of cyanate is added per nitrogen atom present, and the mixture is heated at and maintained at about 80° C. The reaction is complete when the exotherm ceases. Resins prepared by a method which includes this step generally exhibit better anchoring effectiveness than when the carbamyl groups are introduced by the use of urea.

The foregoing carbamyl polyazaalkanes are converted to thermosetting form by reaction with formaldehyde, which introduces hydroxymethyl groups. The reaction is best performed at a neutral or slightly alkaline pH at about 80° C. for about half an hour, the amount of formaldehyde added being equal to between about 1 and 3 mols per mol of urea or cyanate added as the case may be. The final resins typically have a slightly alkaline pH, and are freely water-soluble or water-dispersible.

The number of carbamyl and hydroxymethyl groups thus introduced into the polyazaalkane need only be sufficient to form a thermo-setting resin, that is, a resin which becomes insoluble in water when dried and heated at 105° C. for 10 minutes. This minimum amount varies with the particular polyazaalkane selected, but in each instance is readily determinable by laboratory trial. In practice we prefer to introduce a large excess of these groups over the minimum necessary. The excess groups improving the effectiveness of the resin as an anchoring agent while avoiding the dangers caused by the presence of too few such groups.

It will be understood that during the synthesis mentioned above, a number of side reactions may and in all probability do take place. The formation of alicyclic six membered rings has already been mentioned, and this constitutes one such side reaction. Moreover, the polyazaalkane may contain some organically-bound chlorine which will react with the carbamyl groups when introduced. Further, the methylol groups when introduced may and doubtless do react to some extent with themselves and with any primary or secondary nitrogen atoms present. As a result, the resins disclosed herein are most conveniently described in terms of a typical method of their preparation.

Additional methylolcarbamyl polyazaalkane resins suitable for the practice of the present invention are disclosed in copending application Serial No. 435,931, filed on June 10, 1954, by T. J. Suen et al.

The practice of the process of this invention can be extended so as to include the treatment of a variety of non-fibrous cellulosic films. It may be applied to films of regenerated cellulose prepared from solutions of cellulose xanthates, cuprammonium cellulose, cellulose nitrate, cellulose acetate, cellulose acetobutyrate, and the like.

Amongst those water-repellent topcoats which may be used in the final treatment of the cellulosic films after they have been subjected to treatment in the resin bonding bath are those coating compositions containing as the film-forming constituent compounds such as nitrocellulose, cellulose acetate, methyl cellulose, polyethylene, deacetylated chitin, rubber, chlorinated rubber, rubber hydrochloride, ethyl cellulose, butyl methacrylate, moisture-resistant lacquers, waxes such as montan wax, beeswax, carnauba wax, and other conventional film-forming waterproofing materials. The topcoat is not necessarily a continuous film, and may and often does consist of printed legends, revenue stamps, or decorative matter.

The invention will be further described in the following examples which illustrate the invention but are not to be construed as limitations thereon.

RESIN A

The preparation of a suitable anchoring resin is illustrated by the following, which employs urea as the agent introducing carbamyl groups into the polyazaalkane, the carbamyl groups thus introduced being methylolated by subsequent reaction with formaldehyde.

535 g. of 1,2-dichloroethane and 720 cc. of water were charged into a reaction vessel fitted with thermometer, stirrer, nitrogen gas inlet tube and reflux column and 850 g. of tetraethylenepentamine slowly added. The mixture was heated to reflux under a blanket of nitrogen until the viscosity of the mixture was X on the Gardner-Holdt scale. 130 g. of 50% aqueous sodium hydroxide solution was added to 318 g. of the reaction mixture, followed by 216 g. of urea. The mixture was stirred and the water distilled off at 110° C. under reduced pressure. When the water had been removed, normal pressure was restored and the batch was heated at 135° C. for 1.5 hours. The viscosity of a 50% aqueous solution of the resulting product was D on the Gardner-Holdt scale. The mixture was cooled and 195 cc. of water was then added and the mixture stirred until homogeneous.

The resulting mixture was cooled to 30° C. and 1220 parts of aqueous 37.5% formaldehyde solution added with stirring. The pH was adjusted to 8 and the mixture heated at 80° C. for half an hour at which point reaction of the formaldehyde was substantially complete.

Because 1,2-dichloroethane and tetraethylenepentamine each contain two linear carbon atoms, the resulting methylolcarbamyl polyazaalkane resin contained a substantial proportion of six-membered alicyclic rings.

RESIN B

The following illustrates the preparation of a suitable resin of the present invention employing an alkylenediamine as the starting material and a water-soluble cyanate as agent introducing carbamyl groups into the polyazaalkane thus formed.

A poylazaalkane was prepared by mixing 56.5 grams of trimethylenedichloride (1 mol equiv.) and 62 cc. of water, and slowly adding 73 g. of triethylenetetramine (1 mol equiv.). The mixture was reacted at reflux temperature (80°–95° C.) for three hours in the reaction equipment employed for the preparation of resin A. The product was diluted with 157 cc. of water and at that point had a calculated resin solids content of 33% and a Gardner-Holdt viscosity of D at 25° C.

173 g. of the solution was acidified with 48.8 g. of 37.5% aqueous hydrochloric acid (1 mol equiv.), the temperature rising to 53° C., and 84.5 g. (1 mol equiv.) of 96% potassium cyanate was added. The temperature of the mixture rose further to 72° C. The mixture was maintained at 73° C. for one hour.

100 cc. of water and 162 g. of 37% aqueous $CH_2O$ (2 mol equivs.) were added, and the mixture was reacted at 55° C. for 30 minutes. The product was diluted with 300 cc. of water and contained theoretical resin solids of 15%.

Because trimethylenedichloride contains three linear carbon atoms, the methylolcarbamyl polyazaalkane resin obtained contained substantially fewer six-membered heterocyclic rings than resin A.

RESIN C

The preparation of a particularly effective resin according to the present invention is illustrated by the following.

31.7 g. of 1,2-dichloroethane and 20.2 cc. of water were mixed, and 53.1 g. of 3,3'-iminobispropylamine slowly added. The mixture was reacted at reflux in the equipment employed for the preparation of resin A until the dichloroethane had disappeared, about 90 minutes being required. The reflux temperature was initially 80° C. and rose to 100° C. 81.2 cc. of water was then added. At this point the Gardner-Holdt viscosity of a sample of the reaction mixture at 25° C. was C. The mixture was cooled to 35° C. and 65.4 g. of 32% aqueous hydrochloric acid added with cooling to maintain the temperature below 75° C. the pH of the mixture was 1.5. The mixture was further cooled to 35° C. and 104.0 g. of 96% potassium cyanate added, and the mixture heated at 75° C. for 30 minutes. Water (111.9 cc.) was then added followed by 197.1 g. of 37% formalin. The mixture was heated at 70° C. for 90 minutes; during the heating its pH was alkaline (approx. 8). 335.4 cc. of water was then added and the mixture cooled to room temperature. The product was a light straw-colored liquid having a pH of 8 and a calculated resin solids content of 15% by weight.

Examples

The foregoing resins were tested to determine their effectiveness as anchoring agents by a standard laboratory accelerated immersion test, as follows.

A solution of glycerol in water containing 8% of glycerol by weight was divided into equal portions. One portion was reserved as control, and to this nothing was added. To each of the others was added one of the foregoing resins in amounts shown in the table below. The pH of the baths was not adjusted. Sheets of wet swollen washed regenerated cellulose film were immersed in the resulting baths for five minutes, wiped dry, drained, and clamped to polished chrome plates to prevent shrinkage. The films were then oven dried at 200° C. for the number of minutes shown in the table below. The sheets became barely dry in 3 minutes at that temperature, and were fully dry at the end of 10 minutes. The films were then stripped from the plates. The films containing anchoring resin were water-clear, flexible and odorless. They showed no tendency to "block" when pressed together and possessed good "slip."

The films were then dipped into a standard nitrocellulose topcoat lacquer solution prepared as described in U. S. patent No. 2,394,009, drained, and oven-dried at 200° F. for the times shown in the table below, three minutes at that temperature being about the minimum necessary to dry the topcoat.

Strips were cut from the resulting topcoated films, all edges of the strips being freshly cut, and the strips immersed in water at 190° F. Resistance to sloughing was determined by rubbing the films which contained one of the anchoring resins every two to four minutes and averaging the results. The control films were tested every 20 seconds.

Results were as follows.

| Film No. | Resin | | | Bath, pH | Drying After Impreg.[3] (Min.) | Minutes to Slough in Water at 190° F. | | |
|---|---|---|---|---|---|---|---|---|
| | No. | Percent in Bath[1] | Percent in Film[2] | | | After 3 Min. Topcoat Drying[4] | After 8 Min. Topcoat Drying[4] | After 13 Min. Topcoat Drying[4] |
| 1 | Control | Nil | Nil | | 10 | 1.2 | 1.2 | 1.5 |
| 2 | A | 1.0 | 2.0 | 7.3 | 10 | 30 | 71 | 42 |
| 3 | B | 1.0 | 2.0 | 7.3 | 10 | 97 | 120 | 114 |
| 4 | C | 1.0 | 2.0 | 7.6 | 10 | 134 | 176 | 152 |
| 5 | C | 1.0 | 2.0 | 7.6 | 3 | 105 | | |
| 6 | C | 0.1 | 0.2 | | 10 | 136 | 95 | 72 |

[1] Based on weight of bath.
[2] Estimated, assuming 100% liquid pickup by film.
[3] At 200° F., before application of topcoat.
[4] At 200° F.

In the table, film No. 1 was the control, and the topcoat sloughed from this film almost instantly. Excellent anchoring was achieved in the remaining films, even though the pH of the anchoring resin solution in each case was alkaline. The results in these films show that the results improve as the general resin preparatory process is modified in the direction of resin C, which yielded best results. Film No. 5 shows that excellent anchoring is achieved even when the film is heated only to about the minimum practical extent commercially practicable for drying purposes. Film No. 6 shows that excellent anchoring occurs when the film contains only a trace of the resin.

We claim:

1. Non-fibrous regenerated cellulose film impregnated with a normally water-dispersible thermosetting cationic methylolcarbamyl polyazaalkane resin, wherein said resin is at least partially cured the polyazaalkane from which said resin is prepared having a Gardner-Holdt viscosity of at least about A3 at 25° C. as an aqueous solution containing 33% by weight of resin solids.

2. A non-fibrous regenerated cellulose film impregnated with a thermosetting cationic methylolcarbamyl polyazaalkane resin corresponding to that formed by introducing carbamyl groups into a water-soluble polyazaalkane having a Gardner-Holdt viscosity of between about A3 and T at 25° C. as an aqueous solution containing 33% by weight of resin solids and then reacting with formaldehyde, wherein said resin is at least partially cured.

3. A non-fibrous regenerated cellulose film uniformly impregnated with a thermosetting cationic methylolcarbamyl polyazaalkane resin corresponding to that formed by introducing carbamyl groups into a water-soluble polyazaalkane having a Gardner-Holdt viscosity at 33% resin solids and 25° C. between A and T and then reacting with formaldehyde, wherein said resin is at least partially cured.

4. Non-fibrous regenerated cellulose film uniformly impregnated with a thermosetting cationic methylolcarbamyl polyazaalkane resin corresponding to that formed by first reacting a water-soluble polyazaalkane having a Gardner-Holdt viscosity of between about A3 and T at 33% solids and 25° C. with urea and then reacting with formaldehyde, wherein said resin is at least partially cured.

5. A non-fibrous regenerated cellulose film impregnated with a thermosetting cationic methylolcarbamyl polyazaalkane resin corresponding to that formed by first reacting a water-soluble polyazaalkane having a molecular size such that an aqueous solution containing 33% resin solids by weight has a viscosity between A and T at 25° C. on the Gardner-Holdt scale with a water-soluble metal cyanate, and then reacting with formaldehyde, wherein said resin is at least partially cured.

6. A non-fibrous regenerated cellulose film impregnated with a thermosetting cationic methylolcarbamyl polyazaalkane resin corresponding to that formed by first reacting a water-soluble alkylenepolyamine having at least 2 and not more than 4 linear alkylene carbon atoms with sufficient of a dichloroalkane containing a total of not more than about 4 carbon atoms and containing at least 2 and not more than 3 carbon atoms between the chlorine atoms thereof, the number of carbon atoms between the chlorine atoms of said dichloroalkane plus the number of linear alkylene carbon atoms of the alkylenepolyamine being at least 5, thereby forming a polyazaalkane having a Gardner-Holdt viscosity between A and T at 25° C. as an aqueous solution containing 33% by weight of resin solids, reacting said polyazaalkane with potassium cyanate and further reacting with formaldehyde, wherein said resin is at least partially cured.

7. A non-fibrous regenerated cellulose film impregnated with a normally water-dispersible thermosetting cationic methylolcarbamyl polyazaalkane resin and coated with a water-repellent topcoat, wherein said resin is at least partially cured the polyazaalkane from which said resin is prepared having a Gardner-Holdt viscosity of at least about A3 at 25° C. as an aqueous solution containing 33% by weight of resin solids.

8. A non-fibrous regenerated cellulose film impregnated with a normally water-dispersible thermosetting cationic methylolcarbamyl polyazaalkane resin and coated with a water-repellent heat-sealing topcoat, wherein said resin is at least partially cured the polyazaalkane from which said resin is prepared having a Gardner-Holdt viscosity of at least about A3 at 25° C. as an aqueous solution containing 33% by weight of resin solids.

9. A process of treating non-fibrous regenerated cellulose film which comprises impregnating at least one surface thereof with an aqueous solution of a thermosetting cationic methylolcarbamyl polyazaalkane resin and drying the film, thereby at least partially curing said resin the polyazaalkane from which said resin is prepared having a Gardner-Holdt viscosity of at least about A3 at 25° C. as an aqueous solution containing 33% by weight of resin solids.

10. A process according to claim 9 wherein the pH of the resin solution is 7.0 to 8.0.

11. A process of treating non-fibrous regenerated cellulose film which comprises impregnating at least the surface of said film with an aqueous solution of a thermosetting cationic methylolcarbamyl polyazaalkane resin, drying the film at an elevated temperature thereby at least partially curing said resin the polyazaalkane from which said resin is prepared having a Gardner-Holdt viscosity of at least about A3 at 25° C. as an aqueous solution containing 33% by weight of resin solids.

12. A process of treating non-fibrous regenerated cellulose film which comprises impregnating the film with an aqueous solution of a thermosetting cationic methylolcarbamyl polyazaalkane resin containing a polyhydric alcohol plasticizer for said film and drying said film, thereby at least partially curing said resin the polyazaalkane from which said resin is prepared having a Gardner-Holdt viscosity of at least about A3 at 25° C. as an aqueous solution containing 33% by weight of resin solids.

13. A process of treating regenerated cellulose film which comprises impregnating the film with an aqueous solution of a thermosetting cationic methylolcarbamyl polyazaalkane resin, then impregnating said film with a polyhydric alcohol plasticizer for said film, and drying said film, thereby at least partially curing said resin the polyazaalkane from which said resin is prepared having a Gardner-Holdt viscosity of at least about A3 at 25° C. as an aqueous solution containing 33% by weight of resin solids.

14. A process of treating non-fibrous regenerated cellulose film which comprises impregnating said film with an aqueous solution of a thermosetting cationic methylolcarbamyl polyazaalkane resin, drying the film, thereby at least partially curing said resin, and applying to said film a water-repellent topcoat the polyazaalkane from which said resin is prepared having a Gardner-Holdt viscosity of at least about A3 at 25° C. as an aqueous solution containing 33% by weight of resin solids.

15. A process of treating non-fibrous regenerated cellulose film which comprises impregnating said film with an aqueous solution of a thermosetting cationic methylolcarbamyl polyazaalkane resin having a pH between about 7.0 and 8.0, drying the film thereby at least partially curing said resin, and applying to said film a water-repellent thermoplastic topcoat the polyazaalkane from which said resin is prepared having a Gardner-Holdt viscosity of at least about A3 at 25° C. as an aqueous solution containing 33% by weight of resin solids.

References Cited in the file of this patent

UNITED STATES PATENTS

| | | |
|---|---|---|
| 2,533,557 | Chapman | Dec. 12, 1950 |
| 2,546,575 | Wooding | Mar. 27, 1951 |
| 2,684,919 | Durleigh | July 27, 1954 |

FOREIGN PATENTS

| | | |
|---|---|---|
| 474,601 | Great Britain | Nov. 1, 1937 |